Sept. 25, 1962     T. DZUS ET AL     3,055,071
CLAMP ASSEMBLY
Filed July 7, 1960
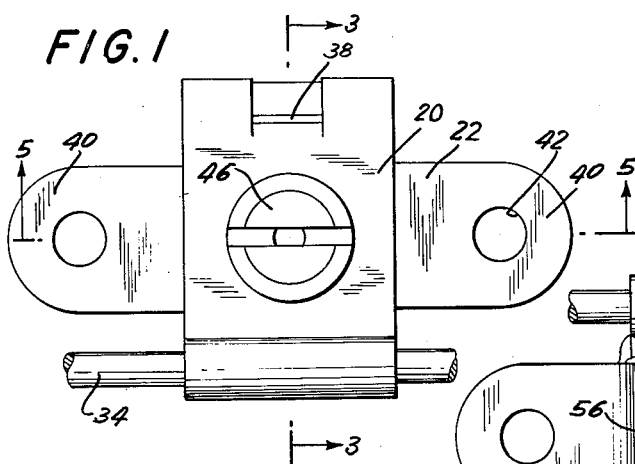
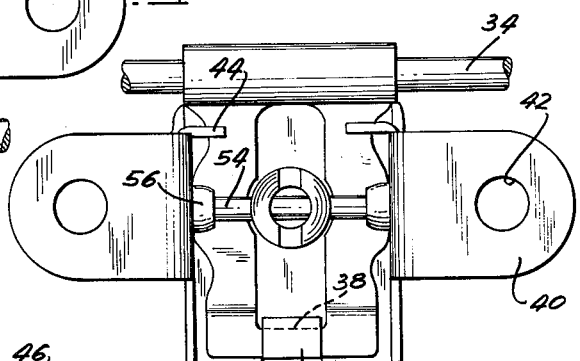
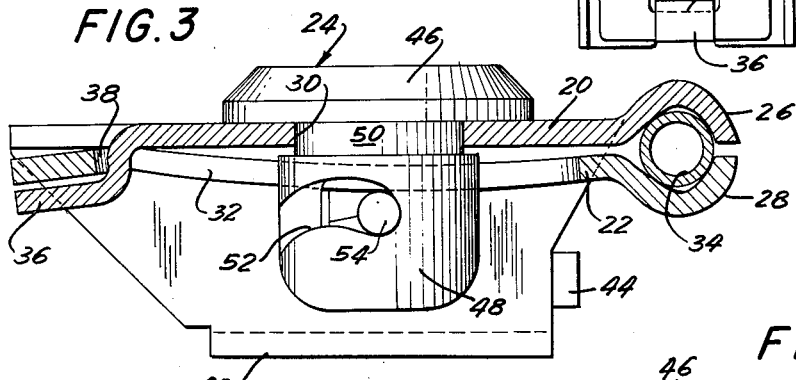
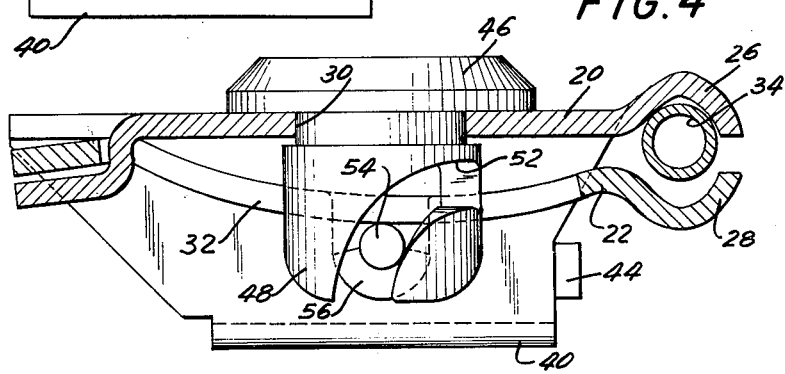
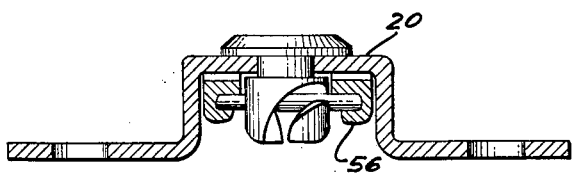
INVENTORS.
THEODORE DZUS
CONRAD J. GUNTHER
BY Daniel H. Kane
ATTORNEYS

… … … … … … … … … … … …

3,055,071
CLAMP ASSEMBLY
Theodore Dzus, West Islip, and Conrad J. Gunther, Hempstead, N.Y., assignors to Dzus Fastener Co., Inc., West Islip, N.Y., a corporation of New York
Filed July 7, 1960, Ser. No. 41,356
1 Claim. (Cl. 24—221)

This invention relates to an improved clamping device and more particularly to a quick acting, self-locking clamp assembly.

In various apparatus and structures it is necessary or desirable to secure parts in place so that they may be readily applied, removed and replaced for installation, servicing, maintenance, repair, inspection, or substitution of other parts. Examples of parts which it is desirable to thus install, remove or replace from time to time are: thermocouples; thermostats; pressure responsive elements; hydraulic, pneumatic and electric lines; tubing, and various types of indicating devices.

It is a particular object of the present invention to provide an improved clamping device which may be used for removably securing parts in place; which can be readily opened and closed when desired but will resist accidental opening while in use; which is compact and occupies a minimum amount of space; which is relatively simple to manufacture, install and use; and, which is rugged and strong so that it can withstand substantial stresses and strains as well as prolonged use and repeated opening and closing with a minimum amount of wear.

In carrying out our invention we utilize a rotatable fastening stud to releasably urge two clamping jaws together under spring tension. When the stud is rotated in one direction the jaws are releasably locked in resilient clamping relation to resiliently clamp the part or device therebetween. When the stud is rotated in the opposite direction the clamping jaws are released so as to free the part or device for removal.

In the accompanying drawing:

FIG. 1 is a top plan view of a clamp assembly embodying our invention showing a part or device clamped therein;

FIG. 2 is a bottom plan view of the clamping assembly shown in FIG. 1;

FIG. 3 is a cross-sectional view on an enlarged scale in the direction of the arrows on the line 3—3 of FIG. 1 with the assembly in clamped position and with the fastener stud shown in full lines;

FIG. 4 is a view similar to FIG. 3 with the parts in unclamped or released position; and, FIG. 5 is a longitudinal section view in the direction of the arrows on the line 5—5 in FIG. 1 with the stud shown in full lines.

In our improved clamp assembly we provide a first and second clamping plate shiftable towards and away from each other and formed with aligned apertures and confronting clamping jaws spaced from the aperture. A rotatable fastening stud extends through the apertures. Resilient means is included in the assembly so that when the stud is rotated in one direction the plates are drawn towards each other and the jaws are locked in clamping relationship under resilient compressive force. When the stud is rotated in the opposite direction the plates and jaws are released from clamping relationship.

Referring to the invention shown in FIGS. 1 to 5, the fastener assembly consists of a first clamping plate 20 and a second clamping plate 22 shiftable towards and away from each other upon rotation of fastener stud 24 to lock and unlock the clamping jaws 26 and 28. The plate 20 has a central aperture 30 for receiving the neck of the fastener stud and the plate 22 has an elongated aperture 32 in registry with the aperture 30 for receiving the shank of the stud. The clamping jaws 26 and 28 project outwardly from one edge of the clamping plates and are shaped to conform with and to grip the particular device intended to be clamped thereby.

In the present instance the improved clamp assembly is shown as clamping a tubular device 34 which may be a thermocouple, thermostat, hydraulic line or the like, and accordingly the jaws are shown as being semi-cylindrical in shape with transversely concave inner surfaces. At the edge opposite the clamping jaws, the clamping plates 20 and 22 are provided with a suitable hinged assembly whereby the plates may be relatively shifted towards and away from each other to close and open the jaws. In the illustrated embodiment the hinge is in the form of a downwardly offset tab 36 formed integrally with the clamping plate 20 and projecting through an aperture 38 spaced from the edge of plate 22.

The assembly should include suitable resilient means so that when the jaws are in clamping position they are urged together under resilient compressive force. In the form of assembly shown the resiliency is imparted by the clamping plates. Thus, one or both of the clamping plates may be bowed outwardly with respect to the other clamping plate.

In the present instance we have shown plate 22 as being bowed outwardly between the hinged connection and the clamping jaws. The size of the jaws and the relative arrangement of the plates are such that when the device 34 is clamped between the jaws the two plates 20 and 22 are spaced apart between the fastener stud and the clamping jaws as shown in FIG. 3. Due to this arrangement the device 34 is clamped under resilient compressive force.

Suitable means may be provided to secure the clamping assembly in place. Thus, we have provided a pair of downwardly projecting right-angular brackets 40 integral with opposite sides of the first clamping plate 20 and having attaching apertures 42 for receiving screws, rivets or the like.

To limit the separation between the two clamping plates when the clamping jaws are opened we provide a pair of stop lugs 44 formed integrally with the attaching brackets 40. When the fastener stud 24 is opened the plate 22 may drop downwardly into engagement with the stops 44.

The fastener stud 24 is of the well known spiral cam type and is provided with an enlarged head 46 which may have a screw driver slot formed therein. The head is positioned on the outer side of plate 20 and the shank 48 of the stud projects downwardly through the apertures 30 and 32 in the two clamping plates.

In the illustrated embodiment the stud has a reduced neck portion 50 positioned in the aperture 30 and since the aperture 30 is smaller than the lower portion of the shank 48 the stud is retained captive with the plate 20 so that it can rotate with respect thereto. The stud can be assembled with the plate 20 in a well known manner by temporarily enlarging the aperture 30, as by a dimpling operation, inserting the stud therethrough and then flattening the plate to again shrink the aperture around the neck of the stud. The lower end of the shank of the stud is formed with suitable fastening means such as the spiral cam slot 52 which extends inwardly from the lower end of the stud.

Cooperative fastening means are provided in operative association with the second clamping plate 22 and this takes the form of a rod or bar 54 suitably secured transversely of the aperture 32 as by brazing or welding or by the attaching lugs 56 shown in FIGS. 2, 4 and 5. The attaching lugs 56 are formed integrally from the material of the second clamping plate 22.

To interengage the fastener stud 24 with the rod 54, the rod is entered into the spiral cam slot 52 and the stud is rotated in a clockwise direction with a result that the rod is shifted upwardly along the spiral cam slot against the resilient force exerted by the bowed clamping plate 22 until the rod is locked behind the locking shoulder of the spiral cam slot. The jaws will then be urged into clamping position under resilient compressive force in the manner most clearly shown in FIG. 3. When stud 46 is rotated in a counterclockwise direction the rod 54 is released from its locked position and is shifted downwardly along the spiral cam slot with the result that the jaws are unclamped to permit the removal or insertion of a device therebetween as shown in FIG. 4.

In assembling our device the two plates are formed in the manner shown and described and the stud 24 may be assembled with plate 20 either before or after the two plates are assembled together.

As previously indicated the clamping assembly may be used to releasably clamp various parts and devices together and is particularly useful in connection with devices which must be frequently removed or replaced for servicing, maintenance, repair or substitution of other parts.

Various modifications may be made in the manner in which the plates are assembled together and also in the form of the resilient means employed for clamping the jaws together under resilient compressive force.

It will thus be seen that we have provided an improved clamping device which can be readily opened and closed when desired but will resist accidentally opening while in use; which is compact and occupies a minimum amount of space; which is relatively simple to manufacture, install and use; and, which is rugged and strong so as to give satisfactory service over a long period of use.

We claim:

A releasable clamp assembly for resiliently gripping and clamping a device comprising first and second clamping plates in aligned relationship having a hinged connection adjacent one end and a pair of clamping jaws in confronting relationship adjacent the opposite end and shiftable towards each other to clamping position and away from each other to open position as the plates are pivoted around the hinged connection, at least one of said plates being bowed outwardly at its central portion with respect to the other plate and said plates having aligned apertures intermediate their ends, and a fastener assembly for said plates for shifting said clamping jaws between clamping and open positions and including a fastener stud having a shank disposed in said apertures with a cam slot having a locking shoulder disposed on a first side of said clamping plates and with a head disposed on the other side of said clamping plates and a complementary fastening member disposed on said first side of said clamping plates and interengageable with said cam slot in the fastener stud to lock behind said locking shoulder when said fastener stud and fastening member are rotated relative to each other in one direction and being released from interengagement when rotated in the opposite direction, said plates being stressed in compression with said bowed plate being at least partially compressed and said fastener assembly being stressed in tension thereby when said fastener assembly is in locked position to cause said clamping jaws to exert a resilient gripping action and to retain said fastening member releasably locked behind the locking shoulder.

References Cited in the file of this patent

UNITED STATES PATENTS

| | | |
|---|---|---|
| 798,601 | Denning | Sept. 5, 1905 |
| 1,043,398 | Clark | Nov. 5, 1912 |
| 1,416,148 | Williams | May 16, 1922 |
| 2,389,184 | Cooke | Nov. 20, 1945 |
| 2,427,365 | Meister | Sept. 16, 1947 |
| 2,473,217 | Peoples | June 14, 1949 |
| 2,474,799 | Dzus | June 28, 1949 |
| 2,614,306 | Dzus | Oct. 21, 1952 |
| 2,831,520 | Clarke | Apr. 22, 1958 |
| 2,849,777 | Ridgers et al. | Sept. 2, 1958 |